Feb. 11, 1969 A. RESZKA 3,427,584

SIGNAL SEQUENCE CORRECTION SYSTEM

Filed May 4, 1964 Sheet 1 of 3

INVENTOR
ALFONS RESZKA
BY R. C. Terry
ATTORNEY

Feb. 11, 1969 A. RESZKA 3,427,584

SIGNAL SEQUENCE CORRECTION SYSTEM

Filed May 4, 1964 Sheet 3 of 3

United States Patent Office 3,427,584
Patented Feb. 11, 1969

3,427,584
SIGNAL SEQUENCE CORRECTION SYSTEM
Alfons Reszka, Northbrook, Ill., assignor to Teletype Corporation, Skokie, Ill., a corporation of Delaware
Filed May 4, 1964, Ser. No. 364,735
U.S. Cl. 340—146.1 6 Claims
Int. Cl. G08b 29/00

ABSTRACT OF THE DISCLOSURE

A communication system used in the distribution of messages, each having a predetermined sequence of signals included in an address portion of the message, includes a temporary storage device in the form of a shift register having sufficient capacity to store at least the predetermined sequence of signals. Recognition of this predetermined sequence of signals or certain variants thereof in predetermined stages of the shift register by a set of coincidence gates produces an output signal which is supplied to the predetermined stages of the shift register to change the sequence stored therein to the predetermined sequence if the stored sequence differs from the predetermined sequence.

Figure 1:
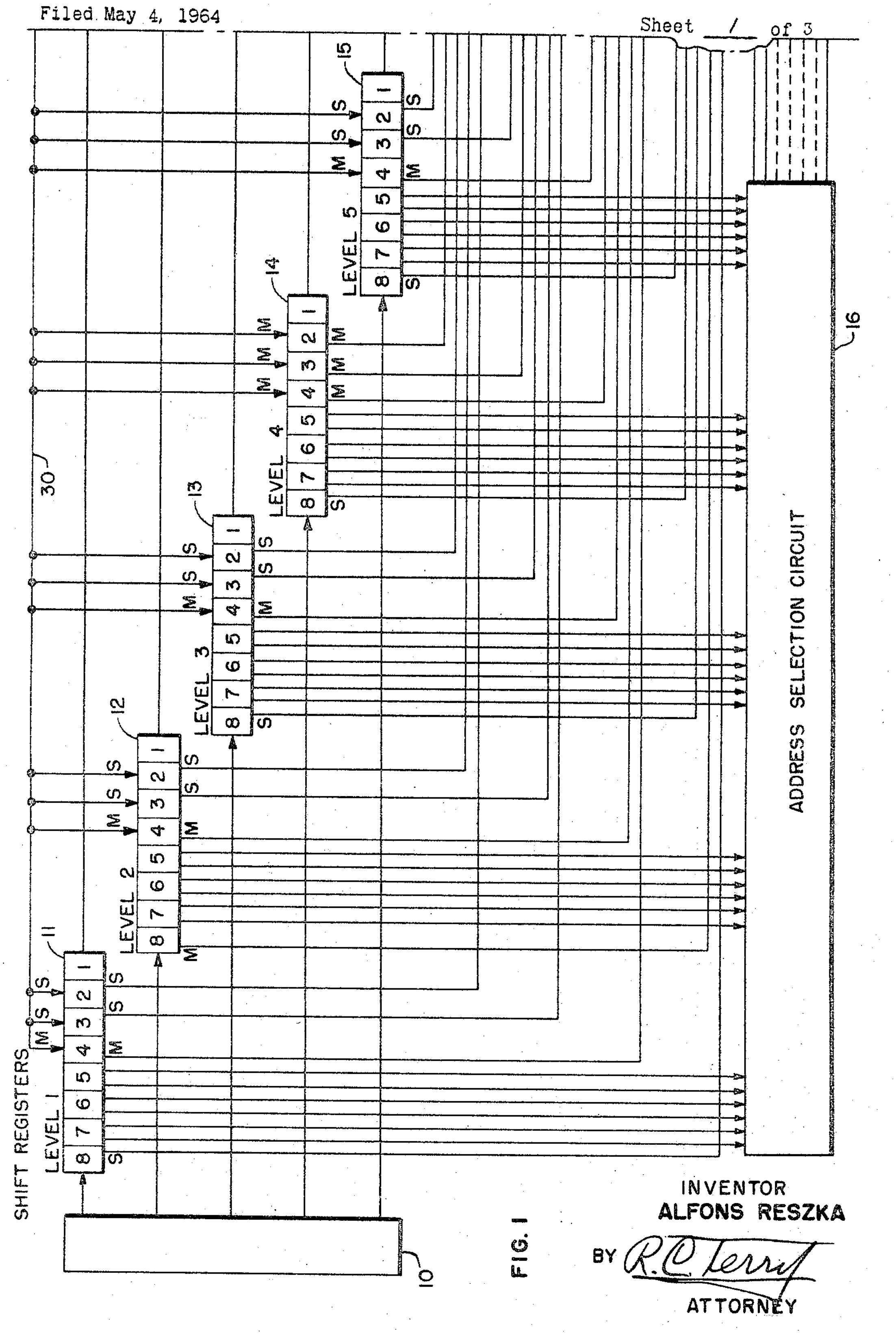

This invention relates to message distribution systems for distributing telegraph messages to selected receiving devices in accordance with address codes preceding each message wherein the address codes are preceded by a fixed start-of-address sequence and, more particularly, to a message distribution system in which the start-of-address sequence is corrected, if it is in error, during the time that the start-of-address sequence is passing through the message distribution system.

This invention primarily is adapted for use with a message distribution system of the type disclosed in the copending application of S. Silberg, Ser. No. 166,286, filed Jan. 15, 1962, now Patent No. 3,147,339. In systems of the type disclosed in that application, the address preceding a message is retained for subsequent redistribution along with the message after using the address to select the particular receiver or receivers to be supplied with the message preceded by that address. If a particular address contains an error, this fact may be ascertained readily in such a system causing the message preceded by the erroneous address to be diverted to an intercept receiver for subsequent manual reprocessing. In such a case the message is not lost but merely is delayed until the proper address may be ascertained manually. In order to allow the widest use of different combinations of characters for addresses, however, it is desirable to cause such a system to recognize given sequences of characters as addresses only when these seqnences are preceded by a predetermined combination of characters designated as a start-of-address code. When a start-of-address code is used to precede address sequences, these same sequences subsequently may appear in the body of the messages transmitted without causing operation of the address selection apparatus; so that no limitation is imposed on the character combinations which may be used for start-of-address code sequences.

A serious problem arises, however, when an error occurs in a start-of-address code sequence since such an error causes the sequence to appear, not as a start-of-address sequence, but as any other random sequence of characters which possibly may appear in a message. If such an error exists, the address codes following the erroneous start-of-address sequence are not recognized as address codes; and, consequently, the desired receivers are not energized and the entire message may be lost without any indication that a message has been lost.

In message distribution systems of the type disclosed in the aforementioned Silberg application, it is possible to assure that the start-of-address code sequence is correct as it leaves the message distribution center since the start-of-address code sequences commonly used are redundant, providing an opportunity for detecting errors in the code while it is passing through the distribution system.

Accordingly, it is an object of this invention to correct a predetermined code sequence in a message distribution system if that sequence is in error when it passes through the system.

It is a more specific object of this invention to detect the presence of a predetermined portion of a start-of-address code sequence passing through a message distribution system and to correct the sequence if it is in error; so that a final recipient printer or other receiving device obtaining a message from the distribution system will receive a correct start-of-address code sequence to place it in proper condition for receipt of the message.

The aforementioned objects are achieved in the preferred embodiment of this invention in which a message distribution system of the type disclosed in the aforementioned Silberg application is used. Such a distribution system utilizes a plurality of multistage shift registers arranged in parallel with each shift register being connected to receive a different level of a permutation coded signal representing a telegraph character. The outputs of the final stages of these shift registers supply the telegraph signals to utlization apparatus such as reperforators or printers. During the time that the telegraph signals are passing through the shift registers, the addresses preceding the messages are stored at a predetermined time in predetermined ones of the stages of the shift registers. At this time, those stages storing the addresses are read and the outputs of those stages are applied to an address selection circuit which determines the particular address which is contained in the registers. The output of the address seleciton circuit then is supplied to the utilization devices to condition them for reception of the ensuing message preceded by the address.

In accordance with this invention, at the same time that the output of the address selection circuit is supplied to the utilization devices, the start-of-address code also is present in predetermined ones of the shift register stages; and the outputs of the stages associated with each character of this code are supplied to an "And" gate for detecting that character. The start-of-address code is chosen to be redundant; so that if an output is present from a predetermined number of the gates responsive to the different characters of the code, an output signal is obtained from an additional gating circuit connected to the outputs of the start-of-address code character recognition gates. At the time that the output of the address selection circuit is used to condition the appropriate utilization device or receivers for receipt of the message, a pulse also is applied to the appropriate inputs of the stages of the shift registers storing the start-of-address code to cause those stages of the shift registers to be set in accordance with the correct start-of-address code sequence irrespective of what sequence may be stored in the shift registers prior to the receipt of this pulse. As a consequence, the start-of-address code supplied from the last stages of the shift registers to the utilization devices is correct; so that the utilization devices will record the correct start-of-address sequence.

Figures 2, 3, 5:
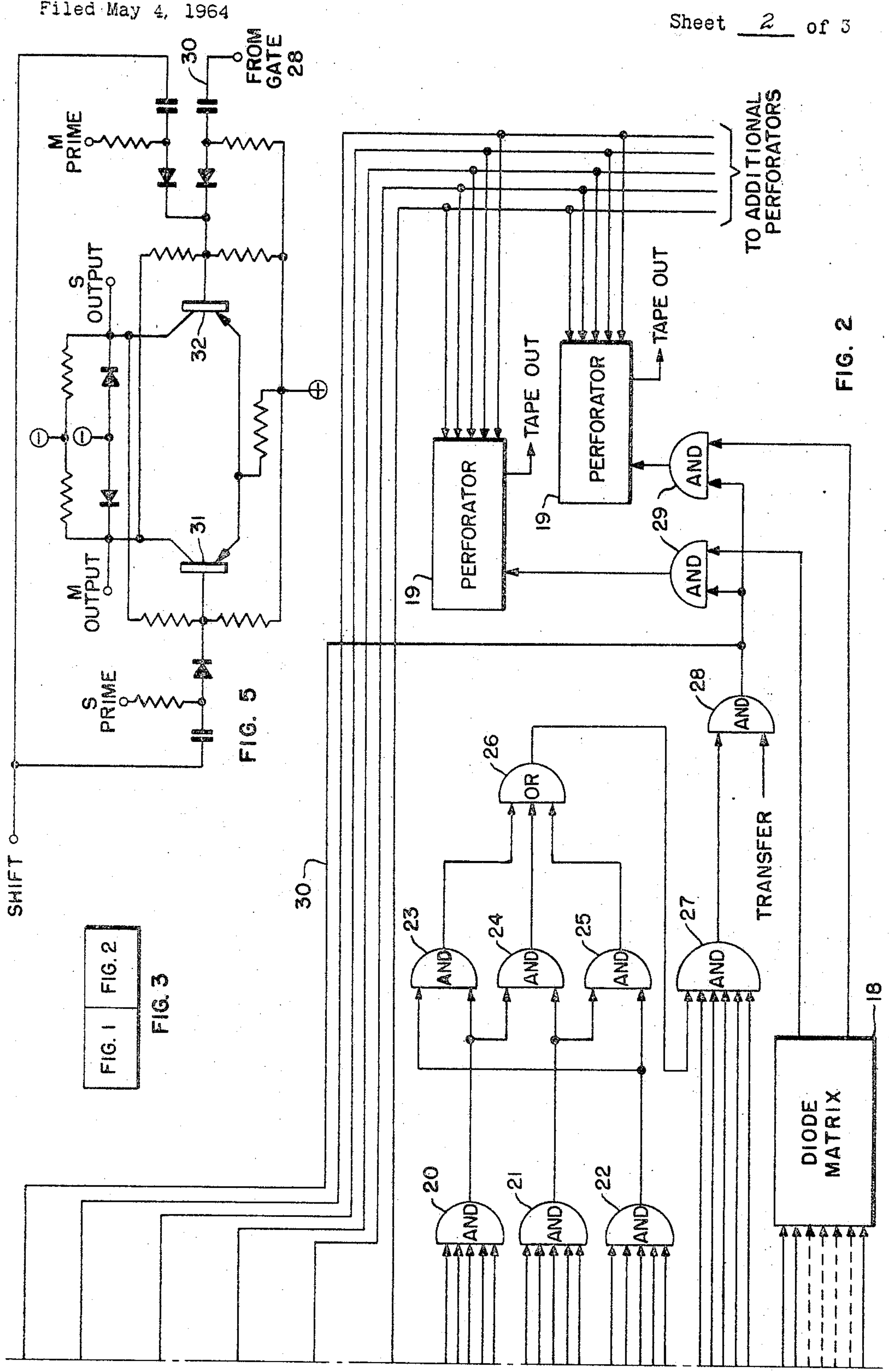
Figure 4:
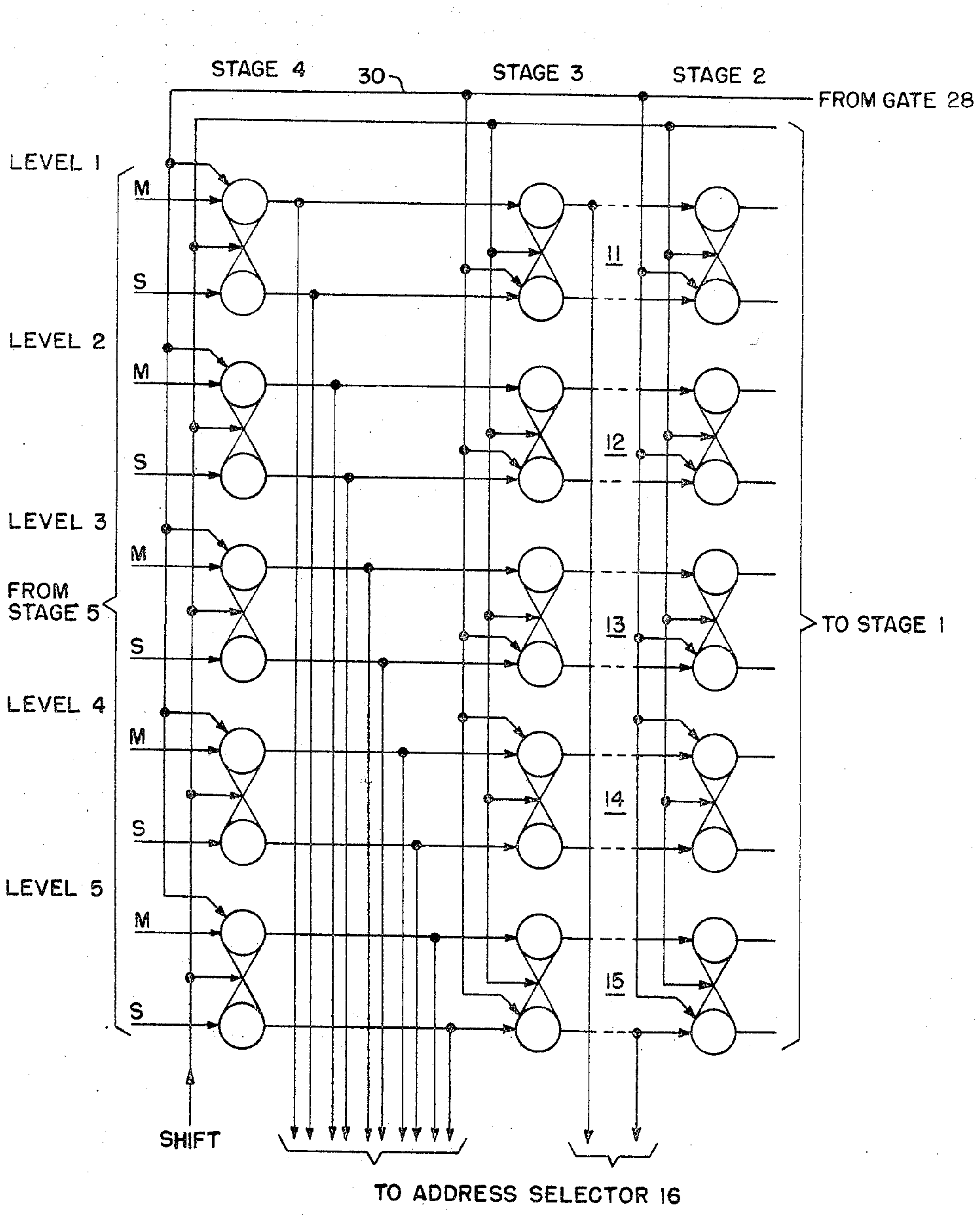

Other objects and features of this invention will become apparent upon consideration of the following detailed specification taken in conjunction with the attached drawings in which, FIGS. 1 and 2 are a block diagram of a preferred embodiment of the invention;

FIG. 3 indicates the manner in which FIGS. 1 and 2 are to be combined;

FIG. 4 is a more detailed circuit diagram of the portion of the shift register circuits storing the start-of-address code; and FIG. 5 is a detailed circuit diagram of the transistor flip-flop used in each stage of each of the shift registers.

Referring now to the drawings, there is shown in FIG. 1 and 2 a block diagram of a message distribution system similar to that disclosed in the previously mentioned Silberg application to which has been added the circuitry forming a specific embodiment of this invention. A detailed explanation of the operation of the basic message distribution system will not be made here since such an explanation appears in the Silberg application, and reference should be made to that application for such details. However, the general operation of the message distribution system will be explained in order to facilitate an understanding of this invention.

As stated more fully in the Silberg application, each character of the telegraph messages handled by the distribution system is supplied in parallel from a suitable source 10, such as a tape reader or receiving distributor, to the eighth stages of a plurality of shift registers 11 through 15, equal in number to the number of information levels in each character of the message. As each character is sequentially supplied to the eighth stages of the shift registers, the next preceding character is shifted from the eighth stages to the next succeeding stages and so forth for each stage, with the messages ultimately being supplied in parallel out of the first stages of the shift registers to suitable utilization devices such as the perforators 19. The perforators 19 are nonresponsive to signals supplied to them from the shift registers unless they previously have been conditioned to respond by the output of an address selection circuit 16 operating through a diode matrix 18 in a manner which is fully described in the aforementioned Silberg application. At the time that the address is supplied to the address selection circuit 16, a start-of-address code, having a fixed sequence of characters which always precedes an address code, is stored in predetermined stages of the shift registers.

As shown in FIG. 1 these stages are chosen to be stages 2, 3 and 4 which store the first, second and third characters of the start-of-address code, respectively. At the same time, a predetermined character is chosen always to follow the address codes; and this character is stored in the eighth stages of the shift registers.

For the purposes of illustration, the start-of-address code is shown as being the sequence, "CARRIAGE RETURN, CARRIAGE RETURN, LETTERS;" and the character following the address is chosen to be "LINE FEED." Thus, when an address is in position to be detected by the address selection circuit 16, the start-of-address sequence should be stored in the shift register with "CARRIAGE RETURN" characters being stored in the second and third stages, a "LETTERS" character being stored in the fourth stages and a "LINE FEED" character being stored in the eighth stages of the shift registers. The outputs corresponding to these predetermined characters stored in the second, third and fourth stages of the shift registers are supplied respectively to "And" gates 20, 21 and 22. As a consequence, only when "CARRIAGE RETURN" characters are stored in stages 2 and 3 of the shift registers is an output obtained from the "And" gates 20 and 21, and only when a "LETTERS" character is stored in the fourth stages of the shift registers is an output obtained from the "And" gate 22.

The start-of-address sequence has been chosen to be redundant, so that any two of the three characters of the sequence is sufficient to allow recognition of the start-of-address sequence. Accordingly, the outputs of the "And" gates 20, 21 and 22 are supplied in pairs to "And" gates 23, 24 and 25 with the output of "And" gates 20 and 22 being supplied to the inputs of the "And" gate 23; the outputs of the "And" gates 20 and 21 being supplied to the inputs of the "And" gate 24; and the outputs of the "And" gates 21 and 22 being supplied to the inputs of the "And" gate 25. The particular combinations shown in FIG. 2 are illustrative only, the only necessity being that all of the different combinations of two of the three outputs of the "And" gates 20 to 22 must be utilized as the inputs for the "And" gates 23 to 25. The outputs of the gates 23 to 25 are supplied to the "Or" gate 26 which provides an output signal any time an output signal is obtained from any one of the gates 23 to 25, which in turn provide an output signal any time that any two of the three gates 20 to 22 provide an output signal.

If the output of the "Or" gate 26 occurs when an actual start-of-address signal is stored in the second, third, and fourth stages of the shift registers, a "LINE FEED" character also is present in the eighth stages of the shift registers, the outputs representative of which are supplied to an "And" gate 27 where they are combined with the output of the "Or" gate 26. As a consequence, the "And" gate 27 provides an output signal whenever any two out of the three characters of a start-of-address code appear in the second, third and fourth stages of the shift registers in their proper sequence simultaneously with the appearance of a "LINE FEED" character in the eighth stages of the shift registers. This output signal from the "And" gate 27 is supplied to an "And" gate 28 to prime that gate.

Following the selection of an address by the address selection circuit 16 and diode matrix 18, a transfer pulse is applied to the other input of the "And" gate 28; and this pulse is passed by the "And" gate 28 only if that gate has been primed by the output of the "And" gate 27 in the manner previously explained. The output pulse obtained from the "And" gate 28 is applied in parallel to a plurality of "And" gates 29 associated with each of the perforators 19 which are included in the system. The gates 29 in turn pass this pulse through them if they have been primed previously by an output from the diode matrix 18 indicating that the addresses for the associated perforators 19 have been selected by the address selection circuit. In other words, the start-of-address pulse is applied to all of the "And" gates 29, and this pulse is passed only by those gates 29 which also are primed by the address selection circuit 16 operating through the diode matrix 18.

At the same time that the transfer pulse is supplied to selected perforators 19 to condition them to respond to receipt of the ensuing message from the first stages of the shift registers, the output pulse from the gate 28 also is supplied to selected inputs of the second, third and fourth stages of the shift registers to cause those stages of the shift registers to be set to store the correct start-of-address sequence irrespective of whether or not the correct sequence is stored therein at the time that this pulse is supplied to the shift register.

Referring now to FIG. 4 there is shown in greater detail stages 2, 3 and 4 of the shift registers 11 through 15. FIG. 4 corresponds to FIG. 2 of the Silberg application and a detailed explanation of the operation of the shift register will not be made here. The pulses obtained from the output of the "And" gate 28 are supplied over a lead 30 to each of the flip-flops constituting the active elements of these stages of the shift registers. In stage 4 of the shift register these pulses are applied to the "marking" inputs of the flip-flops to set all of the flip-flops in stage 4 of the shift registers to "mark" irrespective of the signals stored in these flip-flops prior to the receipt of a pulse on the lead 30. As a consequence, stage 4 of the shift registers 11 through 15 is made to store an all marking signal representative of the "LETTERS" character which is the third character of the start-of-address sequence. In a like manner, pulses on lead 30 applied to the flip-flops of stages 2 and 3 of the shift registers 11 to 15 cause those stages to be set in accordance with the "CARRIAGE RETURN" character. It is to be noted that it makes no difference what characters previously were stored in these stages of the shift registers prior to the receipt of a pulse on the lead 30. If the proper start-of-address sequence already was stored in the shift register, a pulse on the lead 30 will have no effect since the shift registers already contained the proper sequence. However, if any one of the stages 2, 3 or 4 contained an incorrect character in the start-of-address sequence, the pulse on the lead 30 corrects this character; so that when the start-of-address sequence is supplied from the first stages of the shift registers to the perforators 19, it will be recorded by the reperforators 19 in its correct form.

FIG. 5 shows details of a flip-flop of the type used in each stage of the shift registers 11 through 15. A detailed description of the operation of this flip-flop circuit is given in the copending application of F. D. Biggam No. 310,344, filed Sept. 20, 1963, now Patent No. 3,322,896, and reference should be made to that patent for this description. Assume for the purposes of illustration that the flip-flop shown in FIG. 5 is a flip-flop associated with an level of stage 4 of the shift register 11. The flip-flop comprises a pair of transistors 31 and 32. "And" gates are provided in association with the input to each of the transistors 31 and 32, and these gates are capable of accepting a conditioning input (such as the prime input from the previous stage of the shift register) and successfully triggering the associated flip-flop even though the triggering pulse registers simultaneously with the removal of the conditioning input. One such stage gate is shown on each side of the flip-flop, with the gate associated with the flip-flop 31 being primed by space signals from the previous stage of the shift register and the gate associated with the flip-flop 32 being primed by mark signals from the previous stage. Whenever a shift pulse is applied to the shift input, only the gate which is primed from the previous stage passes this shift pulse and causes it to be applied to the base of the transistor associated with that gate to turn the transistor off or to render it nonconductive. This is the normal operation of the flip-flops used in each stage of the shift registers 11 through 15.

Associated with each flip-flop of stages 2, 3 and 4 of the shift registers is an additional gate, indicated in the lower right-hand corner of FIG. 5 as associated with the flip-flop 32. This gate is permanently primed by the source of positive potential provided for the flip-flop and is supplied with pulse inputs over lead 30 from the "And" gate 28. Since this flip-flop gate is permanently primed, any time a pulse appears on the lead 30 this pulse is passed by the gate and is applied to the base of the transistor associated with the gate. As a consequence, any time that a pulse appears on the lead 30, the flip-flops to which the pulse is applied are immediately set to either "mark" or "space" depending upon which one of the transistors 31 or 32 of the flip-flop has the pulse on the lead 30 applied to it. It is apparent that if the flip-flop is to be set to a "space" condition, the permanently primed gate must be associated with the transistor 31.

While this invention has been described in accordance with a specific embodiment illustrated in the drawings, it will be apparent to those skilled in the art that numerous changes and modifications may be made without departing from the scope of the invention. For example, the start-of-address code chosen to illustrate the invention is arbitrary and may be varied to suit the needs of any particular application. In a like manner, the particular stages of the shift registers for storing the start-of-address code at the time it is desired to correct the code may be varied, and the number of levels and number of stages of the shift registers may be changed to accommodate different message formats.

What is claimed is:

1. A communication system of the type used in the distribution of messages having a portion which is distinguished by a predetermined sequence of signals including:

means for temporarily storing at least a number of signals equal to the number of signals in the predetermined sequence of signals;

means for supplying the message signals to the temporary storage means;

means operated in response to the storing of signals in a predetermined part of the temporary storage means for producing an output whenever at least a predetermined part of the predetermined sequence of signals appears in said predetermined part of the temporary storage means; and means responsive to the output of the signal storage responsive means for causing the sequence stored in the temporary storage means to be corrected if it does not correspond to the predetermined sequence.

2. A data communications system of the type used in the distribution of messages having an address portion wherein the address portion is distinguished by a predetermined sequence of characters, the messages being in the form of a plurality of characters arranged in permutative code combinations having a plurality of levels in parallel including:

a plurality of temporary storage means each for storing the information in a different one of the levels and having sufficient capacity to store a number of characters at least equal to the number of characters in the predetermined sequence and the address portion of the message, means for supplying messages to the temporary storage means, means responsive to the storage of characters in a predetermined part of the temporary storage means for producing an output whenever at least part of the predetermined sequence of characters is stored in said predetermined part of the storage means, and means responsive to the output of the character storage responsive means for causing the sequence stored in the predetermined part of the temporary storage means to be corrected if the sequence stored therein differs from the predetermined sequence.

3. A data communications system of the type used in the distribution of binary coded messages having an address portion wherein the portion is preceded by a predetermined sequence of binary characters, the binary coded messages being in the form of a plurality of characters arranged in permutative code combinations having a plurality of levels in parallel including:

a plurality of shift registers equal in number to the number of levels of each permutation coded character in the message, the shift registers having sufficient capacity to store the predetermined sequence and the address portion of the message, means for supplying each character of the message to the input stages of the shift registers with each level of the character being supplied to a different shift register, gating means connected to the outputs of predetermined stages of the shift registers for providing an output signal whenever at least a predetermined portion of the predetermined sequence of characters preceding the address portion of the message appears in the predetermined stages of the shift registers, and means responsive to an output signal from the gating means for changing the sequence of binary characters in the predetermined stages of the shift registers to the predetermined sequence.

4. In a data communications system of the type used in the distribution of binary coded messages comprised of a number of characters encoded in permutation code of a predetermined number of levels, each of the messages having an address portion wherein the address portion includes a predetermined sequence of characters:

a plurality of shift registers equal in number to the number of levels in each character, the shift registers having a sufficient number of stages to store at least the predetermined sequence of characters in the address portion of the message, means for supplying each character of the message to the input stages of the shift registers with each level of the character being supplied to a different one of the shift registers, a plurality of gates connected to predetermined stages of the shift registers for producing an output whenever a predetermined portion of the predetermined sequence of characters appears in the predetermined stages of the shift registers; and means responsive to the output of any one of the gates for changing the sequence of characters in the predetermined stages of the shift registers to the predetermined sequence.

5. In a data communications system of the type used in the distribution of binary coded messages comprised of a number of characters encoded in binary permutation code of a predetermined number of levels, each of the messages having an address portion wherein the address portion includes a fixed sequence of three predetermined binary characters:

a plurality of shift registers equal in number to the number of levels in each character, the shift registers having a sufficient number of stages to store at least the fixed sequence of characters in the address portion of the message, means for supplying each character of the message in parallel to the input stages of the shift registers with each level of the character being supplied to a different one of the shift registers, a plurality of coincidence gates connected to predetermined stages of the shift registers for producing an output whenever a predetermined portion of the fixed sequence of characters appears in the predetermined stages of the shift registers; and means responsive to the output of any one of the coincidence gates for causing the sequence stored in the predetermined stages of the shift registers to be corrected in the event that a portion of that sequence differs from the fixed sequence.

6. A communication system of the type used in the distribution of messages each having an identification sequence of signals including:

storage means for storing the signals and having sufficient capacity to temporarily store at least the identification sequence of signals;

means for supplying the message signals to the temporary storage means;

means responsive to the storage of signals in the storage means for producing an output whenever the identification sequence of signals or variants of said sequence are stored in a predetermined part of the temporary storage means;

means responsive to the output of the recognition means for causing any of said variant sequences and/or said identification sequence to be changed to another sequence of signals.

References Cited

UNITED STATES PATENTS

| | | | |
|---|---|---|---|
| 3,147,339 | 9/1961 | Silbert | 178—4.1 |
| 3,188,609 | 6/1965 | Harmon et al. | 340—146.1 |

MALCOLM A. MORRISON, *Primary Examiner.*

CHARLES E. ATKINSON, *Assistant Examiner.*

U.S. Cl. X.R.

340—147